United States Patent [19]

Tuckerman

[11] 4,217,797
[45] Aug. 19, 1980

[54] METHOD FOR PRODUCING A SPARK WHEEL

[75] Inventor: Edward M. Tuckerman, Cohasset, Mass.

[73] Assignee: The Gillette Company, Boston, Mass.

[21] Appl. No.: 913,179

[22] Filed: Jun. 6, 1978

[51] Int. Cl.² .............................................. B23D 73/08
[52] U.S. Cl. ...................................... 76/101 A; 29/558
[58] Field of Search .......................... 76/101 A, 101 R; 431/273; 29/558, 557, DIG. 15, DIG. 23, 159 R, 78

[56] References Cited

U.S. PATENT DOCUMENTS

| 2,455,348 | 12/1948 | Barstow | 76/101 A |
| 2,543,235 | 2/1951 | Dreyer et al. | 76/101 A |
| 4,027,376 | 6/1977 | Brinkman | 76/101 A |

Primary Examiner—Othell M. Simpson
Assistant Examiner—Roscoe V. Parker
Attorney, Agent, or Firm—Richard A. Wise; Mandel E. Slater

[57] ABSTRACT

A spark wheel blank is provided with spaced helical grooves and lands or the like, as in a conventional threading or knurling operation. The blank so prepared is forced coaxially through the bore of a broaching die having a plurality of circumferentially spaced cutting surfaces which cut spaced notches across the lands to form a plurality of axially and circumferentially spaced teeth on the blank. The spark wheel thus formed is then subjected to an additional broaching step to remove portions of the teeth formed in the first broaching step, providing sharpened teeth for improved sparking performance.

4 Claims, 6 Drawing Figures

4,217,797

METHOD FOR PRODUCING A SPARK WHEEL

BACKGROUND OF THE INVENTION

1. Field of the Invention

This invention relates to spark wheels of the type used for generating sparks to ignite fuel in cigarette lighters and the like, and is directed more particularly to methods of forming the abrasive surfaces on spark wheels.

2. Description of the Prior Art

Spark wheels of the type used in cigarette lighters are usually cylindrical and have an abrasive peripheral surface. The abrasive surface generally comprises a series of teeth or ridges which are arranged in a series of rows across the surface and which extend up from the surface in a common inclined direction. The rotation of such a wheel against a flint generates the fine particles which by rapid oxidation create sparks necessary to ignite a fuel.

Manufacturing processes for toothed spark wheels of the type above described generally involve two stages for the formation of the teeth. In the first stage spiral grooves (leaving lands therebetween) are formed in the peripheral surface of a wheel blank, typically in a screw machine. In a second stage another set of grooves in the periphery of the wheel is formed typically by cold chiseling, along lines generally parallel to the axis of the wheel, the intersecting sets of grooves and lands defining individual sharp cutting teeth. Spark wheels so formed are then generally subjected to a suitable hardening process for increased service life. Although spark wheels made in this manner can provide good sparkig performance, such processes are generally slow and consequently expensive to carry out, since many separate strokes of the chiseling tool are required to form the teeth on each wheel.

Another process utilizing a similar first stage and a simplified second stage (for example as disclosed in U.S. Pat. No. 2,455,348) involves forming all the grooves parallel to the axis of the wheel in a single operation by forcing the grooved wheel once through a broaching die. While this process is relatively efficient, there is the disadvantage that the individual teeth so formed are not very sharp, especially with increasing die wear, and spark wheels formed in this manner rely to a substantial degree for their effective operation on the numerous burrs which are created along the edges of the teeth in the single broaching operation.

SUMMARY OF THE INVENTION

Accordingly it is an object of the present invention to provide a spark wheel which can provide good sparking performance and be easily and inexpensively manufactured.

A further object of the invention is to form a spark wheel by a broaching operation in which the individual teeth so formed on the spark wheel have sharp points.

With these and other objects in view a feature of the present invention is a method of forming a broached spark wheel involving an additional broaching step. A cylindrical spark wheel blank is first provided with a plurality of spaced grooves and lands extending diagonally around the periphery. The grooved blank is subsequently forced coaxially through the bore of a first broaching die which has a plurality of circumferentially spaced cutting surfaces to cut spaced notches across the lands, thereby forming a plurality of axially and circumferentially spaced teeth on the blank. The blank is then subjected to an additional broaching step, which removes portions of the teeth formed in the first broach. The resulting spark wheel so formed has teeth which are remarkably sharp, even after considerable die wear.

In a preferred embodiment of the invention the blank is forced a second time through the first broaching die, after effecting and while maintaining a slight rotational offset between the blank and the first broaching die. In another preferred embodiment a second broaching die substantially the same as the first is used, and the two dies are maintained in axial alignment with a slight rotational offset while the blank is forced through both. In either embodiment of the invention the preferred rotational offset is approximately 1–2 degrees.

The above and other features of the invention will now be more particularly described with reference to the accompanying drawing and pointed out in the claims. It will be understood that the particular methods embodying the invention are shown by illustration only and not as a limitation of the invention. The principles and features of this invention may be employed in various embodiments without departing from the scope of the invention.

BRIEF DESCRIPTION OF THE DRAWING

Reference is made to the accompanying drawing in which are shown illustrative embodiments of the invention from which its novel features and advantages will be apparent.

DESCRIPTION OF THE PREFERRED EMBODIMENTS

Figure 1:
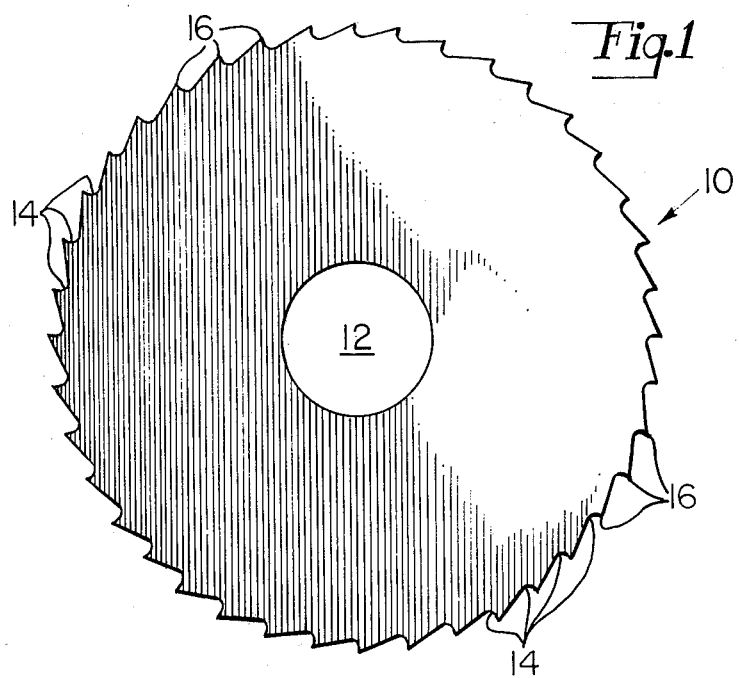
FIG. 1 is an end elevational view of a spark wheel produced according to the invention.
Figure 2:
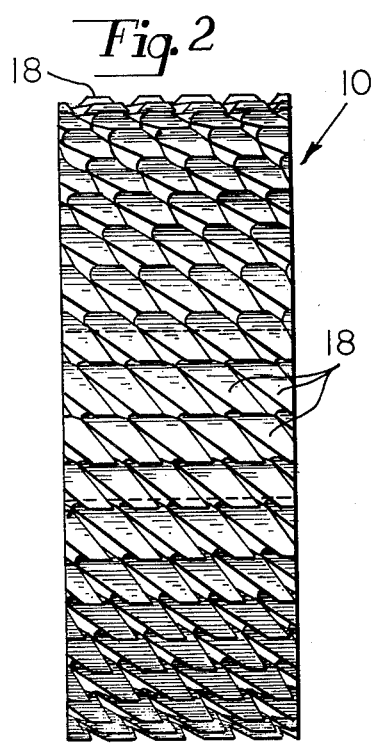
FIG. 2 is a elevational view of the spark wheel as seen from the right of FIG. 1.

Referring to FIGS. 1 and 2, there is shown a spark wheel 10 produced in accordance with the invention. For rotational mounting in typical cigarette lighters it is convenient to provide a central bore 12. A series of grooves 14 running across the surface of the spark wheel parallel to its axis and equally spaced around the circumference divide the wheel into about 40 (more or less) toothed segments 16, as seen in the plane of FIG. 1. In FIG. 2 it is seen how the toothed segments are further divided by intersecting diagonal grooves into a large number of individual teeth 18, staggered one behind another and arranged axially along the spark wheel as well as circumferentially therearound.

Figure 3:
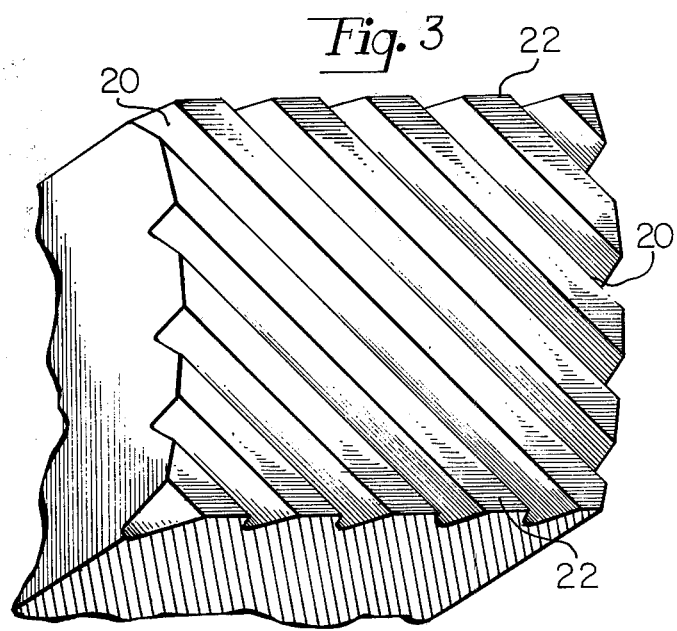
FIG. 3 is a cutaway view, on an enlarged scale, of a portion of a grooved spark wheel blank, prior to the first broaching step.

In FIG. 3 a spark wheel blank has been provided with equally spaced diagonal grooves 20 preparatory to the first broaching step. The formation of the grooves may be by various techniques well known in the art and forms no part of the invention. In the drawing the grooves 20 are V-shaped and are separated by flat-topped lands 22, although other configurations of either or both the grooves and the lands allow the advantages of the invention to be realized.

Figure 4:
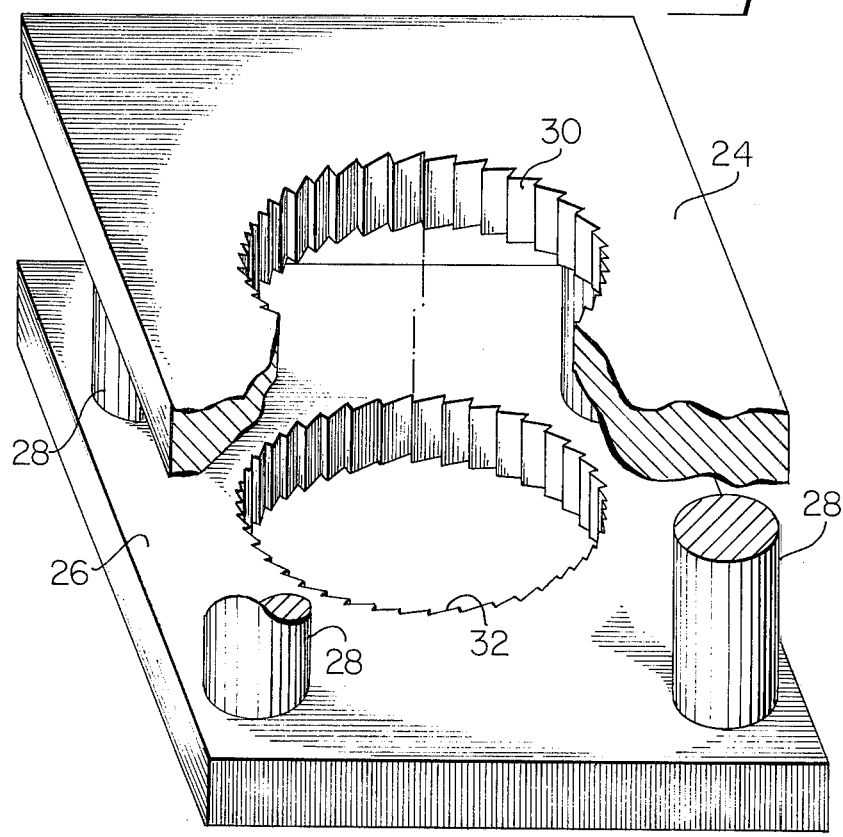
FIG. 4 is a view, partially in section, of a broaching tool suitable for practicing the invention.

Now referring to FIG. 4, the broaching tool shown therein includes first and second broaching dies 24, 26 which are substantially alike, but rotationally offset one from another by somewhat more than one degree of arc and rigidly secured in that offset relationship by mounting pegs 28. Each broaching die has a plurality of circumferentially spaced cutting surfaces 30, 32 respectively, which are complementary to the spark wheel configuration of FIG. 1. The broaching dies are sized so as to be substantially completely filled by a grooved spark wheel blank (FIG. 3), which may typically have a diameter of about 7.11 millimeters (0.280 inch).

As will be appreciated from the die arrangement shown in FIG. 4, double broaching may be completed in one operation by forcing a grooved spark wheel blank coaxially through both dies of the broaching tool in a single thrust. Suitable machinery for such purposes is well known in the art and forms no part of the invention. Alternatively the second broaching may be carried out with the same die used in the first merely by passing the once-broached wheel a second time (from either side) through the die after first effecting a slight rotational offset between spark wheel and die, preferably about 1-2 degrees.

Figure 5:
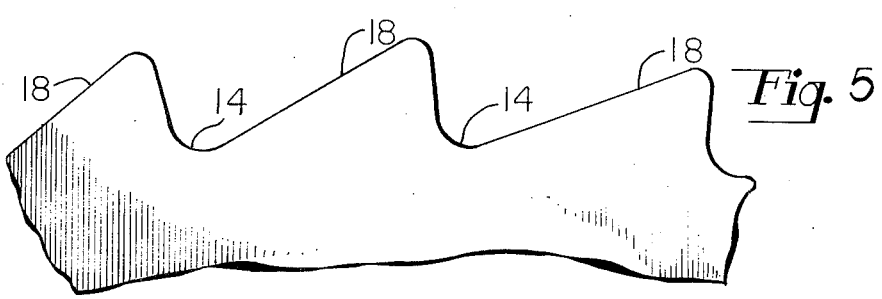
FIG. 5 is an enlarged scale cutaway view of the spark wheel teeth as formed in the first broaching step.
Figure 6:
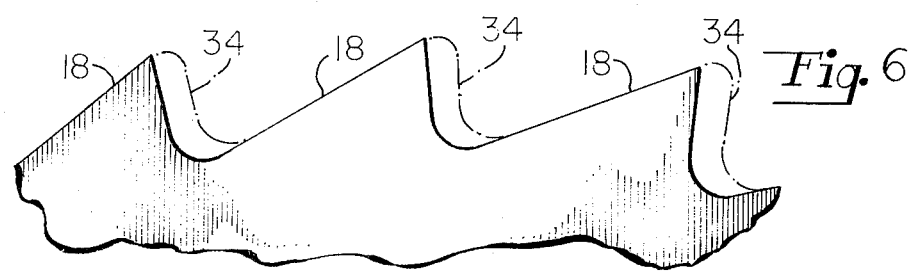
FIG. 6 is a view, similar to FIG. 5, of the teeth after the second broaching step, showing in outline the portions of the teeth removed in the second step.

The beneficial effects of double (or multiple) broaching will be seen with reference to FIGS. 5 and 6. FIG. 5 shows individual spark wheel teeth 18 as formed in the first broaching operation. Even though the cutting surfaces of the die may themselves be in sharp outline, formation of sharp teeth with a single broach is not readily accomplished, and this problem is aggravated with increasing die wear. However an additional broaching step, with rotational offset as described, removes additional metal from the face of each tooth, as indicated at 34 in FIG. 6, leaving outwardly pointed sharp teeth, which are consistently formed, even with increasing die wear.

It will be appreciated that by "additional broaching step" is meant either one more broach or a series of additional passes through the same or similar broaching dies, the cumulative effect of which is the removal of material substantially as indicated in FIG. 6. The teeth so formed provide a remarkable degree of sharpness, and the resulting spark wheel effectively abrades a flint to produce the desired "ball of fire and a puff of smoke."

I claim:

1. In a method of producing a spark wheel including the steps of forming a plurality of spaced grooves and lands extending diagonally around the periphery of a cylindrical wheel blank and subsequently forcing said blank coaxially through the bore of a first broaching die having a plurality of circumferentially spaced cutting surfaces which cut spaced notches across said lands to form a plurality of axially and circumferentially spaced teeth on said blank, the improvement comprising:
   subjecting said blank to an additional broaching step to remove portions of said teeth formed by said first broaching die.

2. A method of producing a spark wheel as defined in claim 1, wherein said additional broaching step comprises effecting a slight rotational offset between said blank and said first broaching die and forcing said blank again through said first broaching die while maintaining said rotational offset.

3. A method of producing a spark wheel as defined in claim 1, wherein said additional broaching step comprises forcing said blank through a second broaching die substantially the same as said first broaching die, wherein said first and second broaching dies are axially aligned and maintained in a slight rotational offset.

4. A method as defined in claim 2 or claim 3, wherein said rotational offset is approximately 1-2 degrees.

* * * * *